(12) United States Patent
Pon et al.

(10) Patent No.: US 8,897,831 B2
(45) Date of Patent: *Nov. 25, 2014

(54) WIRELESS DEVICE CONTENT INFORMATION THEFT PROTECTION SYSTEM

(75) Inventors: Harry Q. Pon, Carmichael, CA (US); Shawn C. Sackman, Shingle Springs, CA (US)

(73) Assignee: Intel Corporation, Santa Clara, CA (US)

(*) Notice: Subject to any disclaimer, the term of this patent is extended or adjusted under 35 U.S.C. 154(b) by 214 days.

This patent is subject to a terminal disclaimer.

(21) Appl. No.: 12/653,525

(22) Filed: Dec. 15, 2009

(65) Prior Publication Data

US 2010/0099379 A1 Apr. 22, 2010

Related U.S. Application Data

(63) Continuation of application No. 10/965,066, filed on Oct. 13, 2004.

(51) Int. Cl.
*H04B 1/38* (2006.01)
*G06F 21/88* (2013.01)

(52) U.S. Cl.
CPC ........ *G06F 21/88* (2013.01); *G06F 2221/2117* (2013.01); *G06F 2221/2143* (2013.01); *G06F 2221/2147* (2013.01); *G06F 2221/2149* (2013.01)
USPC .......................... 455/550.1; 455/410; 455/411

(58) Field of Classification Search
USPC ......... 455/411, 410, 558, 450.1; 380/49, 4, 9; 340/5.2
See application file for complete search history.

(56) References Cited

U.S. PATENT DOCUMENTS 5,734,978 A  3/1998  Hayatake et al.
5,748,084 A  5/1998  Isikoff
5,898,783 A * 4/1999  Rohrbach .................... 340/5.31

(Continued)

FOREIGN PATENT DOCUMENTS

EP  0697662 A1  2/1996
JP  2002374564 A  12/2002

(Continued)

OTHER PUBLICATIONS

Shinagawa et al., "Exploiting Segmentation Mechanism for Protecting Against Malicious Mobile Code", Department of Information Science, Faculty of Science, University of Tokyo, May 17, 2000, 16 pages.

(Continued)

*Primary Examiner* — Phuoc H Doan
(74) *Attorney, Agent, or Firm* — John F. Travis

(57) ABSTRACT

A wireless device, such as a laptop computer or a cellular phone, may contain confidential information which may be secured by an internal security system. When the device is stolen, the user can provide a portion of a kill code to a wireless service provider. The wireless service provider provides its own portion of the kill code and combines it with the user's supplied code. Then, the service provider may transmit the combined kill code to the wireless device. Upon receipt, the wireless device may erase all confidential information on the device. In other embodiments, it may erase any unlocked block of memory. As still another alternative, the system may also, upon receipt of the combined kill code, disable the operating system.

12 Claims, 3 Drawing Sheets

(56) References Cited

U.S. PATENT DOCUMENTS

| | | | |
|---|---|---|---|
| 6,223,290 B1 * | 4/2001 | Larsen et al. | 726/3 |
| 6,259,908 B1 | 7/2001 | Austin | |
| 6,321,079 B1 * | 11/2001 | Cooper | 455/411 |
| 6,542,730 B1 | 4/2003 | Hosain | |
| 6,791,995 B1 | 9/2004 | Azenkot | |
| 7,050,419 B2 | 5/2006 | Azenkot | |
| 7,054,624 B2 | 5/2006 | Cocita | |
| 2004/0114766 A1 | 6/2004 | Hileman et al. | |
| 2004/0204021 A1 * | 10/2004 | Cocita | 455/550.1 |
| 2005/0037732 A1 | 2/2005 | Kotzin | |
| 2006/0126553 A1 | 6/2006 | Lim | |
| 2009/0247130 A1 * | 10/2009 | Kokubo | 455/411 |

FOREIGN PATENT DOCUMENTS

| | | | |
|---|---|---|---|
| KR | 10-2001-0043378 A | 5/2001 | |
| KR | 10-2007-0048808 A | 5/2007 | |
| WO | 99/57843 A1 | 11/1999 | |
| WO | 2006/044746 A2 | 4/2006 | |
| WO | 2006/044746 A3 | 8/2006 | |

OTHER PUBLICATIONS

International Preliminary Report on Patentability for PCT Patent Application No. PCT/US2005/037170, mailed on Apr. 26, 2007, 8 pages.

International Search Report/ Written Opinion for PCT Patent Application No. PCT/US2005/037170, mailed on Jun. 14, 2006, 14 pages.

German Patent Office, Examination Report for DE Application No. 11 2005 002 266.8-53, dated Jun. 30, 2010, 4 pages.

Examination Report issued in corresponding German Application No. 11 2005 002 266.8-53, Feb. 13, 2009, 4 pages.

Examination Report issued in corresponding German Application No. 11 2005 002266.8-53, Feb. 6, 2008, 2 pages.

Examination Report issued in Corresponding Korean application No. 10-2007-7007509. Sep. 30, 2008, 13 pages.

Office Action received for China Patent Application No. 200580033155.4. mailed on Apr. 11, 2008, 8 pages of English Translation and 7 pages of Office Action.

Office Action received for Taiwan Patent Application No. 094135509, mailed on Jun, 5. 2007, 1 page of English Translation and 3 pages of Office Action.

* cited by examiner

WIRELESS DEVICE CONTENT INFORMATION THEFT PROTECTION SYSTEM

CROSS REFERENCE TO RELATED APPLICATIONS

This application is a continuation of U.S. patent application Ser. No. 10/965,066, filed Oct. 13, 2004, and claims priority to that filing date.

BACKGROUND

This invention relates generally to wireless devices.

Wireless devices include any device that can receive a wireless communication. Examples of such devices include cellular telephones, laptop computers, and personal digital assistants, to mention a few examples.

Portable devices, including portable wireless devices, are prone to theft. When stolen, not only is the property taken, but also confidential information, stored on the wireless device, may be obtained which may be misused. Examples of such confidential information include banking information, passwords, and addresses.

The owner of the wireless device is victimized through the loss of the hardware. The owner also suffers the possibility of further victimization through the unauthorized access to confidential information.

Thus, there is a need for a way to protect the confidential information when a wireless device is misappropriated.

DETAILED DESCRIPTION

Figure 1:
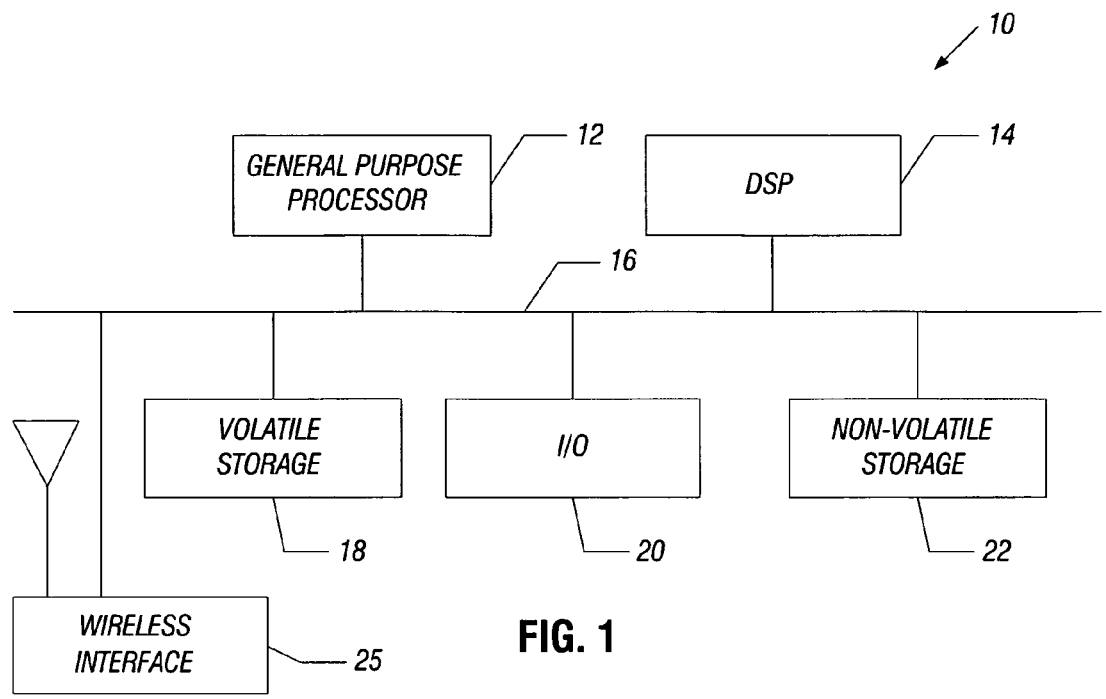
FIG. 1 is a system depiction of one embodiment of the present invention.
Figure 2:
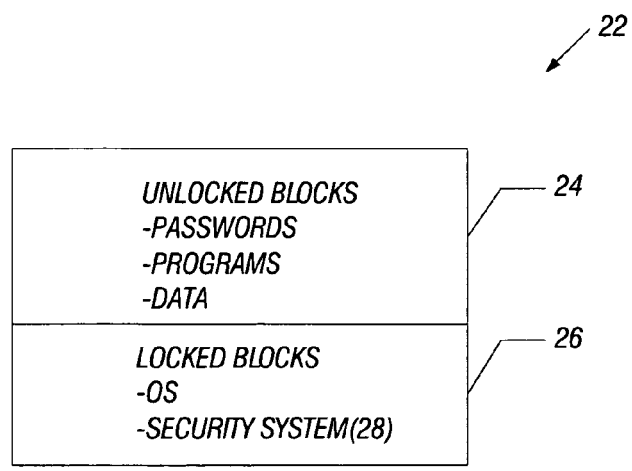
FIG. 2 is a schematic depiction of the non-volatile storage shown in FIG. 1 in accordance with one embodiment of the present invention.

Referring to FIG. 1, a wireless device 10 may include a general purpose processor 12 coupled to a bus 16. The wireless device may be a laptop computer, a personal digital assistant, or a cellular telephone, to mention a few examples. In some cases, such as when the device 10 is a cellular telephone, it may also include a digital signal processor (DSP) 14, also coupled to the bus 16. A variety of elements may be coupled to the device 16 as well, including a volatile storage 18, an input/output device 20, and a non-volatile storage 22. In one embodiment, the non-volatile storage 22 may be flash memory. In another embodiment, the storage 22 may be a small form factor hard drive, removable or embedded memory card, or a subscriber identity module (SIM) device.

Also coupled to the bus 16 is a wireless interface 25. The wireless interface may be a cellular wireless interface, or a wireless interface in association with any other wireless standard. It may be, for example, to transmit messages over a radio frequency network. The wireless interface may be an antenna or a wireless transceiver, although the scope of the present invention is not limited in this respect. For example, the antenna may be a dipole antenna in one embodiment of the present invention.

In accordance with one embodiment of the present invention, the non-volatile storage 22 may be implemented by a semiconductor memory such as a flash memory. In one embodiment the storage 22 may be implemented at least in part by a removable memory card or stick. In such an embodiment, blocks within the memory may be either locked or unlocked. Unlocked blocks may store anything other than the operating system for the system 10 and the security system 28, which will be described hereinafter. Unlocked blocks may store everything other than the operating system and the security system, including passwords, programs, and data. At least some of the information stored in the unlocked blocks may be confidential information which the user would prefer not to have land in the wrong hands.

Conventionally, flash memories may include locked blocks to prevent their erasure under any circumstances. Then, unlocked blocks can be programmed and reprogrammed by the user.

Figure 3:
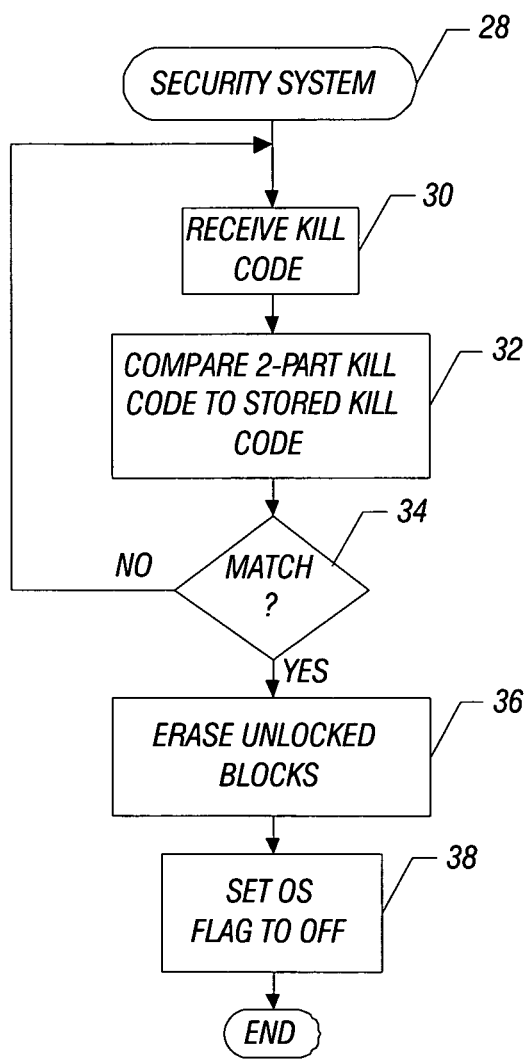
FIG. 3 is a flow chart for a software 28, shown in FIG. 2, in accordance with one embodiment of the present invention.

Referring to FIG. 3, the security system 28 may be implemented in software executed by the general purpose processor 12. The security system software 28 initially may receive a kill code. A kill code is a code transmitted by a service provider, such as a wireless service provider, after the device 10 has been stolen. The kill code directs the device 10 to self-destruct certain features. Those features may include the erasing of unlocked blocks of memory 28. It may also ultimately result in the permanent disabling of the device 10 in some embodiments.

A two-part kill code may be provided. That two-part kill code may be permanently stored within the security system 28. The kill code may include a code which only the service provider knows and a code which only the device 10 owner or user knows. Only when both the user and the wireless provider provide their codes and the service provider combine their codes, can the system 10 be disabled.

In some embodiments, this assures the user that the system provider cannot use the security system 28 to simply cutoff the user. At the same time, it secures the service provider who is unable to disable the system without the user's consent, registered via the user providing the kill code which, in some embodiments, may only be known to the user.

The security system software 28 causes the two-part kill code to be compared to a stored kill code permanently resident within the device 10, for example, in the locked blocks 26 of the non-volatile storage 22.

If a match is detected, as indicated at diamond 34, all unlocked blocks may be erased as indicated in block 31. Alternatively, all of the information in unlocked blocks may simply be reprogrammed to be all zeros or all ones, as another example.

Then, in some embodiments, after the software 28 has fully executed its function, it may set an operating system flag to off as indicated in block 38. The next time the operating system runs through the code, it finds the flag set to off, preventing the operating system from executing any further. This may permanently disable the device 10 in some embodiments of the present invention.

Figure 4:
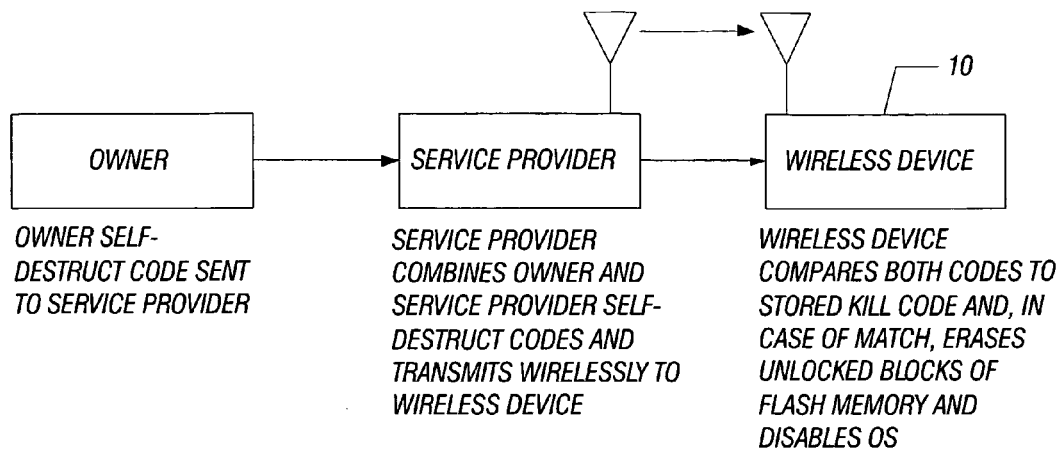
FIG. 4 is a diagram illustrating the operation of one embodiment of the present invention; and, FIG. 5 is a flow chart for software in accordance with another embodiment of the present invention.

Referring to FIG. 4, the operation of the kill code is further illustrated. The owner or user provides a self-destruct code to the service provider. More accurately, the user provides his or her own portion of the overall self-destruct code. The service provider then combines the owner provided self-destruct code with the service provider provided self-destruct code. Then, the service provider wirelessly transmits the combined kill code to the wireless device 10. This wireless transmission may be at periodic intervals in some embodiments. In other embodiments, it may be continuously broadcast. As still another example, before the wireless device 10 may operate, it may have to request authorization from the service provider. Upon such a request, the service provider can provide the kill code.

In some embodiments, the service provider can turn the wireless device 10 on so that the user cannot prevent its actuation and destruction by simply maintaining the device 10 in an off state.

The wireless device 10 then compares both codes received from the service provider to the stored kill code. In case of a match, the device 10 erases unlocked blocks of flash memory and disables the operating system.

In accordance with another embodiment of the present invention, non-volatile storage 22 may be one time programmable. In one embodiment, non-volatile storage 22 may be a one time programmable memory that stores both portions of the kill code when the wireless device 10 is originally provided to a customer. The owner would then transmit the service provider's portion of the kill code to the service provider and would keep the other portion on the device 10.

In still another embodiment of the present invention, the owner can create the kill code and program it into the non-volatile storage 22 where it would be locked. For example, a graphical user interface may prompt the user to enter the two kill codes thru a keyboard which is part of the input output device 20. The system may then automatically transmit the service provider portion to the service provider. In other words the user may be asked to enter a user portion thru a graphical user interface and then the user is automatically asked to provide a service provider portion so that a device 10 knows which one is the service provider portion. Then, the device 10 may automatically transmit the service provider portion to the service provider.

Figure 5:
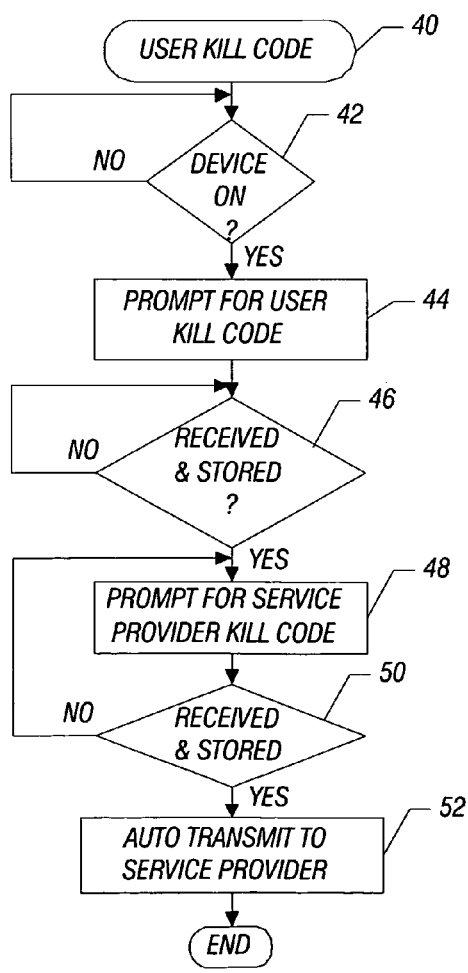

Referring to FIG. 5, in accordance with another embodiment, the user kill code software 40 may be stored in the non-volatile storage 22 in one embodiment of the present invention. The software 40 begins by determining whether the device 10 is on in diamond 42. If so, the user is prompted (e.g., via a graphical user interface) for the user kill code as indicated in block 44. When that kill code is received, it is stored as indicated in diamond 46. When stored, the user is then prompted (e.g., via a graphical user interface) for the service provider kill code as indicated in block 48. A check at diamond 50 determines whether the service provider kill code has been received and stored. If so, the service provider kill code is automatically transmitted to the service provider as indicated in block 52.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method, comprising:
   receiving, by a wireless communication device, a first code from a user;
   wirelessly transmitting the first code to a service provider; and
   storing a two part kill code containing the first code and a second code;
   wherein the wireless communication device is to disable its operation upon receiving the two part kill code from the service provider.

2. The method of claim 1, further comprising:
   receiving the second code from the user prior to said storing; and
   transmitting the second code to the service provider.

3. The method of claim 1, further comprising:
   receiving the two part kill code from the service provider; and
   disabling the wireless communication device if the received two part kill code matches the stored two part kill code.

4. The method of claim 1, wherein said disabling comprises erasing unlocked blocks of non-volatile memory or disabling an operating system.

5. An article comprising a medium storing instructions that, if executed, enable a wireless device to perform operations comprising:
   receiving a first code from a user;
   wirelessly transmitting the first code to a service provider; and
   storing a two part kill code containing the first code and a second code;
   wherein the wireless communication device is to disable its operation upon receiving the two part kill code from the service provider.

6. The medium of claim 5, wherein the operations further comprise:
   receiving the second code from the user prior to said storing; and
   transmitting the second code to the service provider.

7. The medium of claim 5, wherein the operations further comprise:
   receiving the two part kill code from the service provider; and
   disabling the wireless communication device if the received two part kill code matches the stored two part kill code.

8. The medium of claim 5, wherein said disabling comprises erasing unlocked blocks of non-volatile memory or disabling an operating system.

9. A wireless communications device containing a processor, a wireless interface, and memory, the memory containing instructions that when executed by the device cause operations comprising:
   receiving a first code from a user;
   wirelessly transmitting the first code to a service provider; and
   storing a two part kill code containing the first code and a second code;
   wherein the wireless communication device is to disable its operation upon receiving the two part kill code from the service provider.

10. The device of claim 9, wherein the operations further comprise:
    receiving the second code from the user prior to said storing; and
    transmitting the second code to the service provider.

11. The device of claim 9, wherein the operations further comprise:
    receiving the two part kill code from the service provider; and
    disabling the wireless communication device if the received two part kill code matches the stored two part kill code.

12. The device of claim 9, wherein said disabling comprises erasing unlocked blocks of non-volatile memory or disabling an operating system.

* * * * *